United States Patent [19]
Blanding

[11] Patent Number: 5,956,069
[45] Date of Patent: Sep. 21, 1999

[54] SKEWED PRESSURE ROLLERS

[75] Inventor: Douglass L. Blanding, Rochester, N.Y.

[73] Assignee: Eastman Kodak Company, Rochester, N.Y.

[21] Appl. No.: 09/069,321

[22] Filed: Apr. 29, 1998

[51] Int. Cl.⁶ ................................................ H04N 1/12
[52] U.S. Cl. .................... 347/219; 347/218; 347/262; 347/264; 359/619; 400/636
[58] Field of Search .................... 347/262, 264, 347/218, 219; 101/228; 226/181; 358/296; 400/568, 636; 359/619

[56] References Cited

U.S. PATENT DOCUMENTS

| | | | |
|---|---|---|---|
| 4,726,293 | 2/1988 | Ende | 101/228 |
| 5,326,011 | 7/1994 | Mager et al. | 226/181 |
| 5,557,413 | 9/1996 | Ebihara et al. | 358/296 |
| 5,674,019 | 10/1997 | Munakata et al. | 400/568 |

*Primary Examiner*—N. Le
*Assistant Examiner*—Hai C. Pham
*Attorney, Agent, or Firm*—Nelson Adrian Blish; David A. Novais

[57] ABSTRACT

An apparatus (40) for scanning an image to a lenticular material (43) having a first pressure roller (11), which in combination with the first drive roller (13), forms a nip (10) for moving the lenticular materials (43). An axis (71) of the first pressure roller (11) is skewed at an angle to an axis (73) of the first drive roller (13). A second pressure roller (21) forms a second nip (20) in combination with a tensioning roller (23) for tensioning the lenticular material (43). An axis (61) of the second pressure roller (21) is skewed at an angle to an axis (63) of the tensioning roller (23). A scanner writes an image to the lenticular material (43) as it passes between the first and second nip (10,20).

9 Claims, 3 Drawing Sheets

SKEWED PRESSURE ROLLERS

CROSS REFERENCE TO RELATED APPLICATIONS

U.S. Ser. No. 08/961,057, filed Oct. 30, 1997, entitled A METHOD FOR PRINTING INTERDIGITATED IMAGES, by Lee W. Tutt.

FIELD OF THE INVENTION

This invention relates in general to printing digital images to lenticular medium, and in particular to use of skewed pressure rollers to transport lenticular medium.

BACKGROUND OF THE INVENTION

In order to write high quality digital images, it is necessary to insure that the spacing between the lines of the image is kept uniform. Otherwise, image defects known as "banding," caused by small variations in the spacing between lines of an image will become visible in the resulting image. The human eye is very sensitive to this defect and noticeable banding appears at variations as small as 0.1%. Therefore, in the design and manufacture of high quality digital printers, great care is taken to assure that the spacing between lines is uniform.

One type of digital printer uses a rotating mirror such as a polygon to scan a modulated laser beam onto a line on a medium such as photographic paper. The medium is moved slowly in the "cross-scan" direction to place each successive line adjacent to the previous line. To achieve band free images, the velocity of the medium in the cross scan direction, sometimes called the slow-scan direction, must be kept constant. Variations of this velocity are known as flutter, and flutter in excess of 0.1% can cause visible banding. To insure that flutter performance in the slow scan drive apparatus will not cause banding, great care is taken in the design and manufacture of all the components of the slow scan subsystem. Precision bearings and couplings, low runout shafts and rollers, precision drive motor, encoder, and other components are used to assure acceptable flutter performance.

A typical slow scan media drive apparatus 40 is shown in FIG. 1. The medium 41 is engaged in nip 10, which is formed by loading pressure roller 11 against drive roller 13 by force 12. Motor 14 causes roller 13 to rotate, and slowly pull the medium 41 in the direction shown by arrow 42. Upstream of nip 10 is another nip 20. Nip 20 is formed by loading pressure roller 21 against tensioning roller 23 by force 22. Motor 24 applies opposing torque to keep the medium 41 under tension between nip 10 and nip 20. Writing of an image occurs at scan line 30, between nip 10 and nip 20, as the medium is pulled past platen roller 31.

The field of writing digital images on lenticular media is relatively new. One of the problems posed by writing digital images on lenticular media is that one surface of the lenticular material is "bumpy ". FIG. 2 shows a lenticular medium 43 being conveyed through a slow scan drive apparatus 40. Lines of an image are written on the smooth underside 44 of the medium 43. The top surface 45 of the lenticular medium is covered by lenticules 51. The size of the lenticules has been exaggerated for clarity. As the lenticules 51 pass through nips 10 and 20, they cause pressure rollers 11 and 21 to lift and fall a small amount. If the lenticules are large, the magnitude of the lift and fall will be large and if the lenticules are small, the magnitude of the lift and fall will be small. In either case, the passage of the lenticules through the nips will result in some amount of variation in the height of the pressure rollers. This raising and lowering of the pressure rollers produces a variation in speed of the medium as it is being conveyed through the apparatus. Even small disturbances such as those caused by the lenticules going through the nips are capable of degrading the flutter performance of the slow scan drive sufficiently to result in banding in the scanned image.

It is desirable to provide a system for conveying lenticular material through a slow scan media drive apparatus which minimizes flutter caused by lenticules.

SUMMARY OF THE INVENTION

It is an object of the present invention to provide a slow scan media drive apparatus for minimizing flutter due to processing of lenticular material.

The present invention is directed to overcoming one or more of the problems set forth above. Briefly summarized according to one aspect of the present invention, an apparatus for scanning an image to a lenticular material comprises a first pressure roller, which in combination with the drive roller, forms a nip for moving the lenticular materials. The axis of the first pressure roller is skewed at an angle to an axis of the drive roller. A second pressure roller forms a second nip in combination with a tensioning roller for holding the lenticular material in tension between the first nip and the second nip. The axis of the second pressure roller is skewed at an angle to the axis of the tensioning roller. A scanner writes an image to the lenticular material as it passes between the first and second nip.

The problem of individual lenticules producing a bumpy passage through the nip is solved by skewing the pressure roller at a small angle to the drive rollers. In this way, the pressure roller is always supported by more than one lenticule at a time. Thus, the pressure roller does not raise and lower over each lenticule, so the passage of the lenticular medium through the nip is smooth. Therefore, velocity variations of the medium sufficient to produce banding are avoided.

The above, and other objects, advantages and novel features of the present invention will become more apparent from the accompanying detailed description thereof when considered in conjunction with the following drawings.

DETAILED DESCRIPTION OF THE INVENTION

The present description will be directed in particular to elements forming part of, or in cooperation more directly with, the apparatus in accordance with the present invention. It is understood that elements not specifically shown or described may take various forms well known to those skilled in the art.

Figure 1:
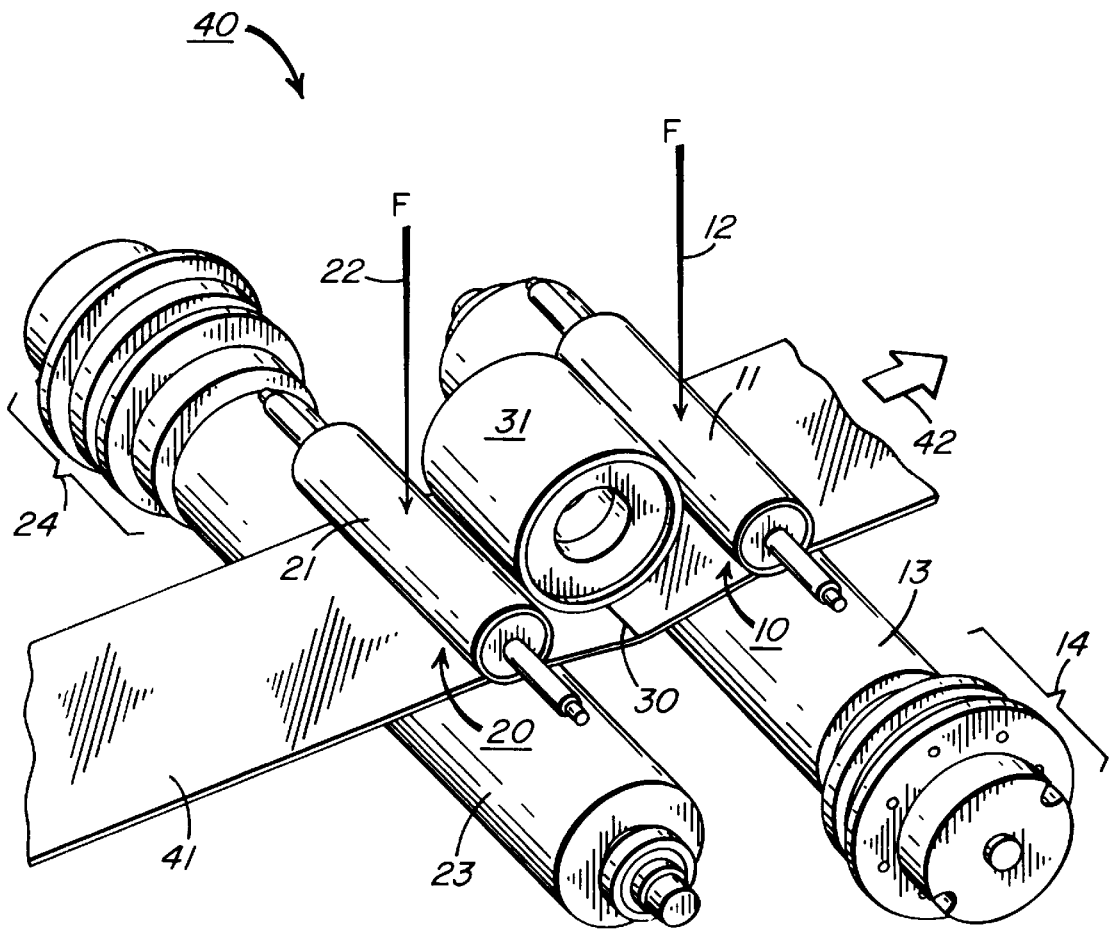
FIG. 1 shows a conventional slow scan media drive apparatus.
Figure 2:
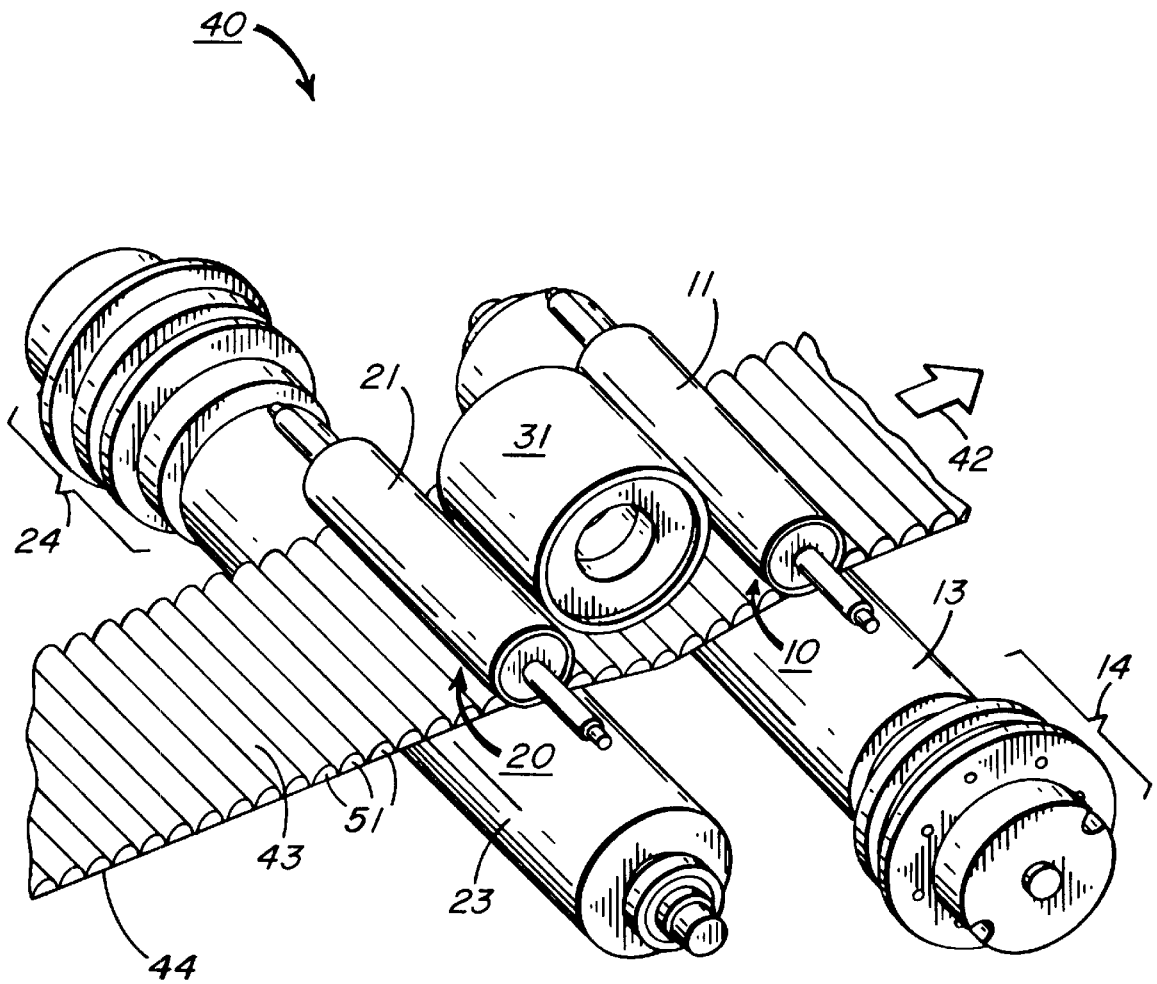
FIG. 2 shows a lenticular medium being conveyed through the slow scan apparatus.
Figure 3:
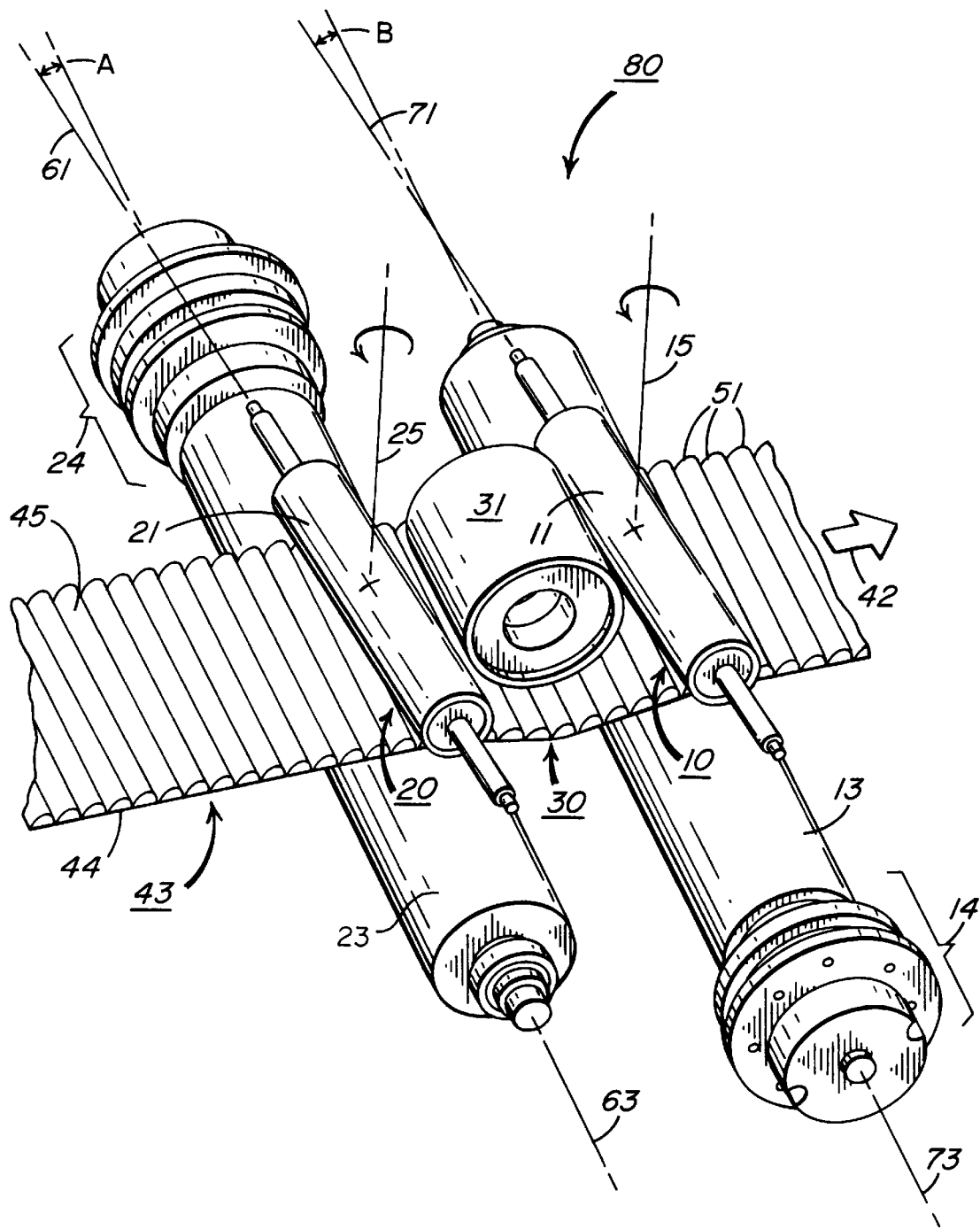
FIG. 3 shows an embodiment of a slow scan media drive apparatus according to the present invention.

Referring now to the drawings, wherein like characters designate like or corresponding parts throughout the several views, there is shown in FIG. 3 an apparatus which shows one embodiment of the present invention. In this embodiment, a slow scan media drive apparatus 80 draws lenticular media through nip 10 and nip 20. Nip 10 is formed by loading pressure roller 11 against drive roller 13 by applied force 12. Motor 14 rotates roller 13 and slowly pulls the medium 43 in the direction shown by arrow 42. Upstream nip 20 is formed by loading pressure roller 21 against tensioning roller 23 by application of force 22. Motor 24 applies opposing torque to keep the medium 41 under tension between nip 10 and nip 20. Writing of an image occurs at scan line 30 as the medium is pulled past platen roller 31.

The pressure rollers 11 and 21 in this embodiment are skewed by a small angle about axes 15 and 25, respectively. Thus, the axis 71 of pressure roller 11 is no longer substantially parallel to the axis 73 of drive roller 13. In a similar fashion, the axis 61 of pressure roller 21 is no longer substantially parallel to the axis 63 of tensioning roller 23.

The skew angle A and the skew angle B necessary to provide a flutter-free operation of slow scan media drive apparatus 80, depend on a number of factors including diameter of the pressure rollers, diameter of the drive roller and diameter of the tension roller. Other factors are the width of the lenticular material 43, the height of the lenticules, and the number of lenticules per meter. Considering these factors, skew angles as small as a fraction of 1° and as great as 10° should provide flutter-free operation.

The drive roller 13 and the tensioning roller 23 have a relatively high coefficient of friction with the medium 43. In contrast, the pressure rollers 11 and 21 have a relatively low coefficient of friction with the medium. High coefficient of friction of the drive and tensioning rollers is achieved by applying an elastomeric covering to the rollers. A low coefficient of friction of the pressure rollers is achieved by using rollers with a bare metal surface.

By providing a relatively low coefficient of friction between the top surface 45 of lenticular material 43 and rollers 11 and 21, and substantially higher coefficient of friction between the lenticular medium and the drive and tensioning rollers in comparison with the coefficient of friction between the medium and the pressure rollers, the movement of the medium through the apparatus will be controlled by the drive and tensioning rollers. The alignment of the drive and tensioning rollers are set to a high degree of tolerance. The skewed pressure rollers will, therefore, not be able to influence the tracking behavior of the web, other than to provide a nip force.

The invention has been described in detail with particular reference to certain preferred embodiments thereof, but it will be understood that variations and modifications can be effected within the spirit and scope of the invention. For example, the skew angle between the first pressure roller and the drive roller need not be the same as the angle between the second roller and the tensioning roller. Also, the skew angle between the first pressure roller and the drive roller may be a positive angle and the skew axis between the second drive roller and the tensioning roller may be a negative angle. Also, tensioning devices other than that shown may be used.

| PART LIST | |
|---|---|
| 10 | nip |
| 11 | pressure roller |
| 12 | force |
| 13 | drive roller |
| 14 | motor |
| 20 | nip |
| 21 | pressure roller |
| 22 | force |

| PART LIST (continued) | |
|---|---|
| 23 | tensioning roller |
| 24 | motor |
| 30 | scan line |
| 31 | platen roller |
| 40 | apparatus |
| 41 | medium |
| 42 | arrow |
| 43 | lenticular medium |
| 44 | underside |
| 45 | top surface |
| 51 | lenticules |
| 61 | axis |
| 63 | axis |
| 71 | axis |
| 73 | axis |
| 80 | slow scan media drive apparatus |

What is claimed is:

1. An apparatus for scanning an image to a lenticular material comprising:

a first pressure roller forming a first nip with a drive roller for moving said lenticular material, an axis of said first pressure roller being skewed at a first angle to an axis of said drive roller so that said first pressure roller is supported by more than one lenticule of said lenticular material;

a second pressure roller forming a second nip with a tensioning roller for holding said lenticular material in tension between said first nip and said second nip, an axis of said second pressure roller being skewed at a second angle to an axis of said tensioning roller so that said second pressure roller is supported by more than one lenticule of said lenticular material; and a scanner for writing said image to said lenticular material.

2. The apparatus as in claim 1 wherein said scanner writes said image to a smooth surface of said lenticular material.

3. The apparatus as in claim 1 wherein said scanner writes said image to a surface of said lenticular material at a location between said first nip and said second nip.

4. The apparatus as in claim 1 wherein said first angle and said second angle are equal.

5. The apparatus as in claim 1 wherein said first pressure roller has a surface with a low coefficient of friction and said second pressure roller has a surface with a low coefficient of friction.

6. The apparatus as in claim 1 wherein said drive roller has a surface with a high coefficient of friction.

7. The apparatus as in claim 6 wherein said tensioning roller has a surface with a high coefficient of friction.

8. The apparatus as in claim 1, wherein each of said first and second pressure rollers are on a side of said lenticular material which includes lenticules.

9. An apparatus for transporting a lenticular material having a smooth side and a bumpy side comprising:

a pressure roller forming a nip with a drive roller for moving said lenticular material, an axis of said pressure roller being skewed at an angle to an axis of said drive roller, such that said pressure roller is supported by more than one lenticule of said lenticular material to prevent a variation in height of said pressure roller as said pressure roller passes over said lenticular material; and a tensioning device for holding a portion of said lenticular material between said tensioning device and said nip in tension.

* * * * *